United States Patent Office 3,543,529
Patented Dec. 1, 1970

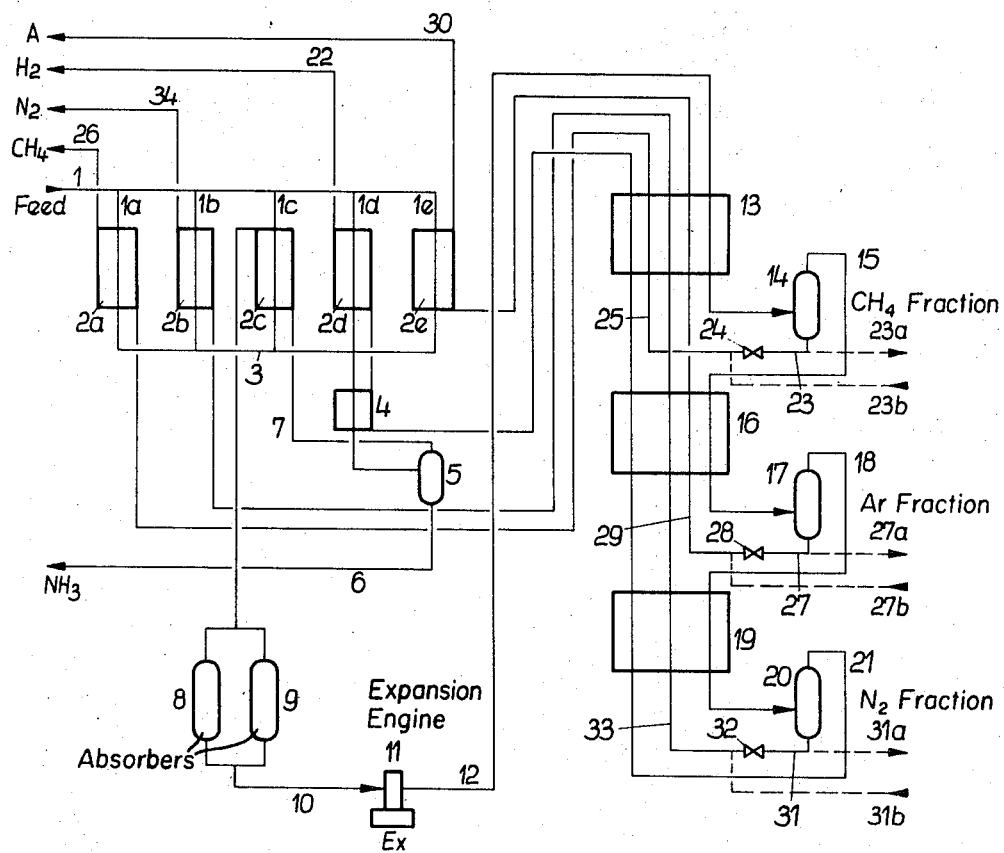

---

3,543,529
SEPARATION OF AMMONIA SYNTHESIS OFF GAS BY ENGINE EXPANSION AND SEPARATION
Helmut Knapp, 3 Mittelweg, 6369 Massenheim, uber Bad Vilbel, and Martin Streich, 44 Urseler Weg, 6 Nieder Eschbach, Taunus, Germany
Filed Aug. 22, 1968, Ser. No. 754,637
Claims priority, application Germany, Aug. 29, 1967, 1,667,185
Int. Cl. F25j 3/00, 3/06
U.S. Cl. 62—23     9 Claims

ABSTRACT OF THE DISCLOSURE

Components in a release gas of ammonia synthesis equipment are extracted by cooling the release gas with at least one part of the decomposition component to a temperature slightly above the freezing point of ammonia. The condensed ammonia is precipitated and the remaining release gas is reheated against at least one part of the ammonia-containing release gas with the residual ammonia being removed by approximately surrounding temperature. The ammonia-free release gas is then released under high pressure in an expansion machine with the resulting cold being used to condense the ammonia. The release ammonia-free gas is then decomposed into a fraction concentrated into one or more higher-boiling fractions.

BACKGROUND OF INVENTION

The invention relates to a method for the extraction of at least one component of the constituents obtained in the release or expansion gas of high-pressure synthesis equipment, particularly ammonia synthesis equipment.

In the synthesis gas of ammonia equipment, which is obtained by vapor-methane reforming, inert constituents are contained therein in addition to the hydrogen and nitrogen:

(1) Argon

Since air contains 1.3% argon, it is unavoidable that argon enters together with air into the auxiliary reformer. On the basis of balance of material, there appear therefore 0.3% argon in the synthesis gas.

(2) Methane

Even if the reforming is carried out under strict conditions, i.e., at high temperatures and high vapor-methane ratio, there still remains a residual amount of 0.3 to 0.4% methane. Furthermore, in the methanization of the residual amount CO and the residual amount $CO_2$ methane is still added.

The inert gases, namely 0.3% argon and about 0.9% methane do not participate in the synthesis reaction in the ammonia reactor and therefrom are concentrated in the synthesis cycle.

In order to maintain the concentration of the inert gases at a still admissible concentration, it is constantly necessary to release gas. Along with the inert gas stream, however, valuable synthesis gas is also lost. A higher release current decreases the inert gas concentration, i.e., improves the requirements for the syntheses, but increases the losses of synthesis gas.

For reasons of economy the inert gas concentration most advantageously should be maintained at 12 to 14%. With 13% inert gas in the synthesis gas, the loss of hydrogen amounts to 8%.

Equipment for the recovery of hydrogen from release gas has already been developed and constructed (see P. L. Charlesworth, The Recovery of Hydrogen From Industrial Gas Mixtures, The Chemical Engineer, April 1965). However, this process does not use the free energy contained in the release gas, which is under a pressure of 150 to 250 at.

SUMMARY OF INVENTION

An object of the invention is to provide a method for recovering the valuable products contained in a synthesis release gas as concentrated and as economically as possible. Particularly it is the object of the invention that the ammonia contained in the release gas and the hydrogen contained therein be separated as completely as possible from the remaining components.

In accordance with this invention components in a release gas of ammonia synthesis equipment are extracted by cooling the release gas with at least one part of the decomposition component to a temperature slightly above the freezing point of ammonia. The condensed ammonia is precipitated and the remaining release gas is re-heated against at least one part of the ammonia-containing release gas with the residual ammonia being removed by approximately surrounding temperature. The ammonia-free release gas is then released under high pressure in an expansion machine with the resulting cold being used to condense the ammonia. The released ammonia-free gas is then decomposed into a fraction concentrated into one or more higher-boiling fractions.

This process has the following advantages:

(1) The release gas from the ammonia synthesis cycle is cooled only up to coolant temperatures. At this temperature there is still about 5% $NH_3$ present in the release gas. Previously, for the recovery of ammonia the release gas had to be cooled by means of a cooling system to 0° C. or better yet to −30° C. At −30° C. there is still about 1% ammonia present in the release gas. For the extraction of the last remainder of ammonia, a water wash had to be used which yielded, however, only a water-ammonia mixture. In the novel process, by means of expansion of the release gas, there is produced sufficient cooling from the original pressure of 150 to 250 at. to a lower pressure of 20 to 50 at. in order to condense the 5% ammonia contained in the release gas and to draw off as liquid pure ammonia. In the expansion, energy can be produced, furthermore, which can be used for example as electric energy.

According to a further development of the invention, the components, separated by partial condensation, are decomposed by further distillation into pure products.

(2) In the step-wise cooling of the release gas there are precipitated one after another a methanoic fraction, an argonic fraction and a highly nitrogenous fraction.

By adding simple distillation apparatus it is possible to produce the components methane, argon, or nitrogen as pure products. The hydrogen-nitrogen product can be admixed to the synthesis gas under an increased pressure of 20 to 50 at.

THE DRAWING

In the single figure is illustrated schematically an arrangement for ammonia synthesis, where five components are extracted. The process is applicable in an equally advantageous manner if only one component is extracted from the release gas.

DETAILED DESCRIPTION

The raw gas which is conducted in conduit 1 from a separator, which in turn operates at coolant temperature, has the typical composition of:

| | Mol percent |
|---|---|
| $H_2$ | 55.0–65.0 |
| $N_2$ | 18.0–22.0 |
| Ar | 3.0–6.0 |
| $CH_4$ | 9.0–15.0 |
| $NH_3$ | 4.0–6.0 |

The gas is distributed to the conduits 1a, 1b, 1c, 1d, and 1e and cooled in heat exchange with the refluxing fractions in the heat exchangers 2a, 2b, 2d, 2e and in the exchange with the raw gas to be heated in exchanger 2c. After the first cooling step the raw gas is combined in conduit 3 and cooled in the exchanger 4 with the aid of the returning hydrogen product to a temperature which is slightly above the freezing point of ammonia. The condensed ammonia is collected in separator 5 and drawn off as liquid ammonia through conduit 6. The gas escaping from separator 5 through conduit 7 still contains 0.1 to 0.2% ammonia. It is heated by exchange with the raw gas in exchanger 2c. In one of the adsorbers 8 or 9, the residual amount of ammonia is removed through suitable adsorption means, e.g., molecular screen.

In the collecting conduit 10 the NH₃-free gas is conducted to the expansion machine 11 and released to a lower pressure. The released, cooled gas is conducted in conduit 12 through exchanger 13 and there cooled by the refluxing products and introduced to the separator 14. In the separator 14 a highly methanoic liquid fraction is collected. The vapor is conducted in conduit 15 through exchanger 16, there cooled against the drawing off products and introduced to separator 17. In separator 17 an argon-rich fraction is collected. The vapor is conducted in conduit 18 through exchanger 19, there further cooled against the drawing off products and introduced into exchanger 20. In exchanger 20 the highly nitrogenous liquid fraction is collected. The vapor precipitated from the separator consists of highly concentrated hydrogen (92 to 95%); the remainder is mostly nitrogen. The hydrogen product is drawn off in conduit 21 from separator 20 and heated in exchangers 19, 16, 13, 4 and 2d. The hydrogen product then leaves through conduit 22 the equipment under a pressure of 20 to 50 at.

The argon-rich fraction is drawn off from separator 14 through conduit 23, released in valve 24 and returned through conduit 25 through exchangers 13 and 2a, whereby it is vaporized and heated. The methane fraction leaves the equipment through conduit 26 and can be used as fuel.

The argon-rich fraction is drawn off from separator 17 through conduit 27, is released in valve 28 and conducted in conduit 29 through exchangers 16, 12 and 2e, whereby it is vaporized and heated. The argon-rich fraction leaves the equipment through conduit 30.

The nitrogen-rich fraction is drawn off from separator 20 through conduit 31, released in valve 32 and conducted in conduit 33 through exchangers 19, 16, 13 and 2b, whereby it is vaporized and concentrated. The highly nitrogenous fraction leaves the equipment through conduit 34.

In the event it is necessary to extract pure methane, pure argon or pure nitrogen, the liquid fractions can be conducted from the separators 14, 17 and 20 through conduits 23a, 27a and 31a to a distillation system for further decomposition. The pure fractions are again conducted through conduits 23b, 27b and 31b to the exchanger system where they serve for the cooling of the raw gas.

What is claimed is:
1. A method for the separation at low temperature of at least one component obtained in the release gas of high-pressure ammonia synthesis equipment, characterized by the following steps:
   (a) cooling the release gas in the heat exchange with at least one of the separated components obtained at the low temperature to a temperature slightly above the freezing point of ammonia,
   (b) precipitating the ammonia as condensate separated from a remaining release gas,
   (c) heating the remaining release gas in the heat exchange with at least one part of the original ammonia-containing release gas to approximately surrounding temperature and then removing the residual content of ammonia at said temperature approximately surrounding temperature,
   (d) reducing the pressure of the ammonia-free release gas from a high pressure under operation efficiency in an expansion machine, and
   (e) separating the expanded ammonia-free release gas by partial condensation into a fraction concentrated in hydrogen and into at least one higher-boiling fraction.

2. The method of claim 1 wherein in step (d) the resulting cold is used to condense ammonia.

3. The method of claim 2, the components separated by partial condensation are separated by further distillation into pure products.

4. The method of claim 3 wherein the hydrogen fraction is extracted under 20–50 atmospheres so that the fraction is conducted to ammonia synthesis in an intermediate step of the compression.

5. The method of claim 4 wherein the ammonia-free gas is precooled by the refluxing fractions prior to entering the expansion machine.

6. The method of claim 4 wherein the ammonia-free gas is precooled by external cooling prior to entering the expansion machine.

7. The method of claim 4 wherein the ammonia-free gas is precooled by the refluxing fractions prior to entering the expansion machine.

8. The method of claim 4 wherein the ammonia-free gas is precooled by external cooling prior to entering the expansion machine.

9. The method of claim 1 wherein the ammonia-free gas is precooled prior to entering the expansion machine.

References Cited
UNITED STATES PATENTS

| | | | |
|---|---|---|---|
| 1,690,585 | 11/1928 | Kniskern | 62—23 |
| 1,745,730 | 2/1930 | Uhde | 62—11 |
| 2,993,342 | 7/1961 | Knoble | 62—38 |
| 3,257,812 | 6/1966 | Shaievitz | 62—28 |
| 3,312,075 | 4/1967 | Becker | 62—23 |
| 3,433,027 | 3/1969 | Charlesworth | 62—23 |

NORMAN YUDKOFF, Primary Examiner

A. F. PURCELL, Assistant Examiner

U.S. Cl. X.R.

62—18, 22, 38; 23—198